Patented Oct. 13, 1942

2,298,866

UNITED STATES PATENT OFFICE 2,298,866

RESINOUS COMPOSITION

Robert E. Burnett, Niskayuna, N. Y., assignor to General Electric Company, a corporation of New York No Drawing. Application October 3, 1940, Serial No. 359,550

10 Claims. (Cl. 260—51)

The present invention relates to new and useful compositions of matter. More particularly it is concerned with the production of a novel synthetic resin that is particularly adapted for uses where high resistance to flame is required. This application is a continuation-in-part of my copending application Serial No. 188,087, filed February 1, 1938, now Patent No. 2,221,440, issued November 12, 1940, and assigned to the same assignee as the present invention.

I have discovered that valuable flame-resisting compositions can be produced by effecting reaction between the components of a mixture comprising essentially (1) an aldehyde and (2) a condensation product of an alkaryl ester containing reactive halogen in the alkyl radical thereof (e. g., tricresyl phosphate containing reactive halogen such as chlorine, bromine, etc., in a methyl radical thereof) and an aromatic monohydroxy compound, specifically a phenol selected from the class consisting of phenol ($C_6H_5OH$) and mono-substituted phenols.

Illustrative examples of other alkaryl esters that may be halogenated in the side chain and the halogenated material used as hereafter more fully described are dicresyl monophenyl phosphate, dicresyl monoxenyl phosphate, dicresyl mononaphthyl phosphate, dicresyl monochlorophenyl phosphate, etc. Any phosphate or other ester of a similar chemical structure may be used. For example, alkaryl carbonates halogenated in the side chain may be used in carrying the present invention into effect. Mixtures of alkaryl esters may be halogenated and thereafter employed in forming the flame-resisting resinous compositions of this invention. For practical reasons I prefer to use those esters that are now commercially available, and especially the phosphates because of the improved flame resistance of the end-product. The alkaryl ester may have in the side chain halogens such, for example, as bromine, chlorine, etc., or mixtures thereof, as desired or as conditions may require. I prefer to use an alkaryl ester containing reactive chlorine in the alkyl radical and, specifically, tricresyl phosphate containing chlorine in a methyl radical thereof.

Any suitable method may be employed for halogenating the alkaryl ester. For example, tricresyl phosphate may be directly chlorinated at 100° to 200° C. in the presence of ultra-violet light, which serves to accelerate chlorination of the methyl groups. In this way reactive groups (—$CH_2Cl$ and perhaps some —$CHCl_2$) are formed, and these subsequently can be joined to phenol, mono-substituted phenols (or to any other aromatic ring containing reactive hydrogen) with the simultaneous elimination of HCl. A more specific illustration of the chlorination technique is as follows: Chlorine gas is slowly bubbled into tricresyl phosphate heated, with vigorous agitation at about 150° C. for, for example, nine hours in the presence of mild ultra-violet light. In this way a yellow viscous oil containing about 20 to 25 per cent by weight of added chlorine is obtained.

The degree of halogenation of the alkaryl phosphate, carbonate, or other alkaryl ester employed, may be varied. In general, the amount of halogen in the side chain groups will range from an average of 1.5 to 4, or more, atoms of halogen per molecule of halogenated alkaryl ester. In obtaining halogenation in the side chain, some halogen also will enter the benzene ring. The ring halogen remains bound during the condensation reaction with the phenol reactant and, also, during the reaction of the resulting condensation product with an aldehyde. Since the flame resistance of the final product is improved by the presence of ring halogen in the halogenated alkaryl ester, it is desirable to introduce a substantial amount of halogen into the benzene ring during halogenation of the alkaryl ester. It is preferred that the ratio of ring halogen atoms per molecule to side chain halogen atoms per molecule be of the order of from 1:1 to 1:4. Thus, when the amount of halogen in the side chain groups is an average of 1.5 to 4 or more atoms of halogen per molecule of halogenated alkaryl ester, the preferred total amount of halogen in the ring and side chain of a halogenated alkaryl ester such, for example, as chlorinated tricresyl phosphate will be an average of approximately 1.9 to 8.0 or more atoms per molecule.

In the case of the chlorination of tricresyl phosphate I have found that up to a total of ten atoms of chlorine per molecule may be introduced into both the side chain and ring, which corresponds to approximately 50 per cent by weight of chlorine. Because of the high reactivity of such a highly chlorinated substance when condensed with phenol or a mono-substituted phenol, it is advantageous to use chlorinated tricresyl phosphate containing less than this amount of total chlorine in the molecule. Best results have been obtained with chlorinated tricresyl phosphate containing about 20 to 25 per cent by weight of total chlorine.

The choice of the phenol reactant used in the preparation of the aldehyde-reactable condensation product depends largely upon economic considerations and the particular properties desired in the final product. Thus, in addition to phenol itself, I may use any mono-substituted phenol, illustrative examples of which are monohalo-phenols, e. g., monochloro-phenols, etc., mono-alkyl-phenols, e. g., the cresols, monoethyl-phenols, monopropyl-phenols, monobutyl-phenols, monoamyl-phenols, etc., monoaryl-phenols, e. g., monophenyl-phenols, etc., monoalkaryl-phenols, e. g., monotolyl-phenols, etc., mono-aralkyl-phenols, e. g., monophenylmethyl-phenols, monophenylethyl-phenols, etc. The substituent group may be in the ortho, meta or para position.

The condensation reaction between the phenol reactant and the halogenated alkaryl ester is carried out as described more fully in my above-identified copending application until substantially all the halogen acid has been evolved. As catalysts for the reaction may be used, for example, iron (preferably in sheet form), sulfur, and the halides (e. g., the bromides and chlorides) of iron, aluminum, tin and zinc. Ferric chloride in anhydrous or hydrated form is the preferred catalyst.

To produce the novel resins of this invention I then cause an aldehyde to react with the phenol-halogenated alkaryl ester condensation product. This reaction may be effected under a wide variety of time, temperature and pressure conditions. Ordinarily the reaction is carried out at temperatures at or above the fusion point of the phenol-halogenated ester condensation product. Reaction may be effected at reduced, atmospheric or superatmospheric pressures. Various aldehydes may be employed, depending upon cost factors and the particular properties desired in the finished product. I prefer to use as the aldehyde reactant formaldehyde or compounds engendering formaldehyde, e. g., paraformaldehyde. For some applications I may use, for instance, acetaldehyde, propionaldehyde, butyraldehyde, acrolein, methacrolein, crotonaldehyde, furfural, benzaldehyde, mixtures thereof, or mixtures of formaldehyde (or compounds engendering formaldehyde) with such aldehydes.

The reaction between the aldehyde and the phenol-halogenated alkaryl ester condensation product may be carried out in the presence or absence of a catalyst. Advantageously a catalyst is employed, since thereby the reaction time is decreased. I prefer to use an acidic catalyst, e. g., camphor sulfonic acid, p-toluene sulfonic acid, chloracetic acid, sulfamic acid, hydrochloric acid, etc.

If desired, the reaction may be carried out in the presence of a solvent, e. g., organic solvents such as methyl alcohol, ethyl alcohol, propyl alcohol, butyl alcohol, etc. Such solvents advantageously may be used when the aldehyde reactant, for instance formaldehyde, is in the form of an aqueous solution. Mixtures of organic solvents also may be employed, for example mixtures of alcohol and solvent naphthas.

The ratio of aldehyde to the phenol-halogenated ester condensation product may be considerably varied. Preferably the amount is chosen so that for each mol of phenol (or mono-substituted phenol) in the phenol-halogenated ester condensation product there is present in the reaction mass more than 1 mol of aldehyde. No particular advantage ordinarily accrues from using more aldehyde than that required to yield a thermosetting resin. When the curing characteristics of the resin are of secondary consideration, I may use less than 1 mol aldehyde for each mol of phenol (or mono-substituted phenol) in the phenol-halogenated ester condensation product.

The properties of the fundamental resins of this invention may be varied, for example, by introducing various modifying bodies before, during, or after effecting condensation between the primary components. Thus, as modifying agents I may use, for instance, amides such as acetamide, stearamide, acryloamides, benzamide, toluene sulfonamide, adipic diamide, phthalamide, malonyl amides, etc.; urea and substituted ureas; aminotriazines, e. g., melamine, ammeline, ammelide, melem, melam, melon, etc.; proteins; amines such as ethylene diamine, aniline, phenylene diamine, benzidine, aminophenols, etc. The modifying bodies also may take the form of high molecular weight bodies with or without resinous characteristics, e. g., lignin, furfural condensation products, protein-aldehyde condensation products, phenol-aldehyde condensation products, urea-aldehyde condensation products, aminotriazine-aldehyde condensation products (e. g., melamine-formaldehyde condensation products), aniline-aldehyde condensation products, sulfonamide-aldehyde condensation products, modified or unmodified, saturated or unsaturated polyhydric alcohol-polybasic acid condensation products, natural gums and resins, e. g., copal, shellac, rosin, etc. Advantageously the modifying agent is one that is reactable with an aldehyde (e. g., urea, benzidine, aniline, aminotriazines, etc.) or one containing free —COOH groups or other reactive groups whereby the modifier can chemically tie into the resin molecule and become an integral part thereof. Examples of these last-named modifiers are rosin, shellac and acidic esters, for instance acidic (incompletely esterified) reaction products of a polyhydric alcohol, e. g., glycerol, and a polycarboxylic acid or anhydride, e. g., phthalic, maleic, etc., acid or anhydride.

In order that those skilled in the art better may understand how the present invention may be carried into effect, the following illustrative examples thereof are given:

*Example 1*

Step A:

| | Parts by weight |
|---|---|
| Chlorinated tricresyl phosphate containing about 24% by weight chlorine | 105 |
| Phenol | 100 |
| Catalyst, specifically ferric chloride (FeCl$_3$.6H$_2$O) | 3.5 |

The above components were heated slowly to 245° C. over a period of about 100 minutes, yielding a reddish brown resin. The residual phenol was removed by heating the resinous mass to 185° C. under 3 mm. pressure. (If desired, the unreacted phenol may be allowed to remain in the reaction mass. In such case, this free phenol condenses with the aldehyde with which the reaction mass subsequently is treated.) The product resulting from the vacuum treatment was a brittle, fusible, practically phenol-free resin when cold. This resin was pulverized and caused to react with an aldehyde as described below:

Step B:

| | Parts by weight |
|---|---|
| Phenol-chlorinated tricresyl phosphate resin of step A | 100 |
| Paraformaldehyde | 10 |
| Catalyst, specifically p-toluene sulfonic acid | 1 |

The above components were ground together, after which an equal weight of wood flour was thoroughly mixed therewith to form a molding (moldable) composition. The resulting compound was molded at about 150° C. for about 10 minutes under a pressure of approximately 3000 pounds per square inch. During the molding operation the paraformaldehyde reacts with the phenol-chlorinated tricresyl phosphate condensation product. The final product (molded compound) was a hard, cured article of high mechanical strength and excellent flame resistance.

Lower or higher proportions of paraformaldehyde may be used if desired, for example from 5 to 50 parts paraformaldehyde per 100 parts of the resinous condensation product of step A. Catalysts other than p-toluene sulfonic acid may be employed, for instance acidic catalysts such as hereinbefore given by way of example. Any suitable amount of catalyst may be used. In general, the higher the amount of catalyst, the faster the resin cures to an insoluble, infusible state.

If desired, the time of curing the resin in the mould may be lessened by advancing the resin toward the insoluble, infusible condition prior to molding, for example by heating the uncatalyzed resin or molding composition until a product of desired cure point results. Thus, a mixture comprising an aldehyde and a thermoplastic phenol-halogenated alkaryl ester condensation product may be fused together for a time such as to yield a thermosetting resin of desired cure point. The fused mass then is cooled, pulverized and mixed with a filler to form a molding composition. Conversion of the resin to an insoluble, infusible state or so-called "C-stage" is completed during the molding operation.

Instead of using a phenol-chlorinated tricresyl phosphate condensation product I may use other condensation products of this same general class, for instance, an o-cresol-chlorinated tricresyl phosphate condensation product prepared, for example, as follows:

|  | Parts by weight |
|---|---|
| Chlorinated tricresyl phosphate containing 20 to 25% by weight chlorine | 200 |
| Ortho-cresol | 200 |
| Ferric chloride | 1 |

The above components are heated for about three or more hours at 150° to 200° C. until substantially all the hydrochloric acid has been evolved. The resulting product is a hard, red, thermoplastic resin when cold. It may be reacted with an aldehyde as above described with particular reference to a phenol-chlorinated tricresyl phosphate condensation product, yielding flame-resisting compositions.

Example 2

|  | Parts by weight |
|---|---|
| Phenol-chlorinated tricresyl phosphate resin described under step A, Example 1 | 200 |
| Alkyd resin, specifically glyceryl phthalate of about 80 to 100 acid number | 200 |
| Paraformaldehyde | 20 |
| Catalyst, specifically p-toluene sulfonic acid | 5 |

Essentially the same procedure was followed as described under step B of Example 1, yielding flame-resisting products of the same general characteristics as the products of that example. The unfilled resinous condensation product cured to an insoluble, infusible state in about 5 to 10 seconds when a small pill of the material was worked on a 170° C. hot plate.

Example 3

|  | Parts by weight |
|---|---|
| Phenol-chlorinated tricresyl phosphate resin described under step A, Example 1 | 200 |
| Benzidine | 50 |
| Paraformaldehyde | 100 |

Same procedure was followed as described under step B of Example 1. The cure time at 170° C. (determined as described under Example 2) of the unfilled resinous condensation product was less than 5 seconds. The cured article had excellent flame resistance.

Example 4

|  | Parts by weight |
|---|---|
| Phenol-chlorinated tricresyl phosphate resin described under step A, Example 1 | 200 |
| Furfural | 100 |

The above components were caused to react by heating them together at an elevated temperature, for example at temperatures of the order of 100° to 160° C. for about 10 to 30 minutes. The reaction preferably is carried out in container provided with a reflux condenser. A dark brown, soft, thermoplastic resin was obtained. The resin was soluble in organic solvents, e. g., ethylene dichloride. Solutions of the resin may be used as baking varnishes for insulation of electrical conductors such as copper wires and the like. Upon heating the coated wire or other article at 150° to 175° C. the resin is converted into a black, hard, glossy, insoluble and infusible resinous film. The resin solutions also may be employed for coating or coating and impregnating fibrous materials, for example paper, cotton, linen or other fabrics, glass fibers in filament, felted, woven or other form, asbestos in yarn, felt, fabric, sheet or other form, mineral wool, etc. Electrically insulating tapes may be made from the treated sheet materials.

Example 5

Step A:

|  | Parts by weight |
|---|---|
| Cresol | 250 |
| Chlorinated tricresyl phosphate containing about 24% by weight chlorine | 252 |
| Catalyst, specifically ferric chloride (FeCl$_3$.6H$_2$O) | 2.5 |

The above components were heated together for about 7 hours at 140° to 190° C., yielding a resin which was brown, fusible and brittle when cold. This resin was pulverized prior to use in carrying out step B.

Step B:

|  | Parts by weight |
|---|---|
| Cresol-chlorinated tricresyl phosphate resin of step A | 200 |
| Shellac | 200 |
| Paraformaldehyde | 20 |

Same procedure was followed as described under step B of Example 1. The cure time at 170° C. (determined as described under Example 2) of the unfilled resinous condensation product was about 5 to 10 seconds. The cured resin had excellent flame-resisting characteristics.

Dyes, pigments and opacifiers may be incorporated into the compositions of this invention to alter the visual appearance and the optical properties of the finished product. If needed, mold lubricants and plasticizers may be added to facilitate molding of the heat-convertible (heat-curable) molding compositions. Various fillers may be used, for instance, alpha cellulose in flock form, asbestos including defibrated asbestos, sand, mica, wood flour, etc., to obtain a wide variety of molding compositions and molded articles adapted to meet particular conditions. Other effect agents also may be added as desired or as conditions may require.

The resinous compositions of this invention may be used in the production of laminated articles wherein sheets of paper, cloth, asbestos, etc., are treated with the resin, for example in solution state. After removing the excess solvent the resin-impregnated sheets are superimposed and united under heat and pressure to form mechanically strong, laminated articles of excellent resistance to heat, flame and moisture and of good electrically insulating characteristics.

These new synthetic resins also may be used as impregnants for electrical coils, for bonding together mica flakes to form laminated mica articles as binders for abrasive particles, in the production of wire enamels and other liquid coating compositions, as modifiers of other natural and synthetic resins, and for numerous other purposes. Thermosetting molding compositions comprising these new resinous materials may be molded into forms suitable for a wide variety of electrically insulating and other applications. For example, they may be molded to form heater connectors such as are used, for instance, with electric irons, toasters, grills, etc., terminal blocks of watt-hours meters, electrical distributing heads and bodies, etc., or, in general, wherever solid electrical insulation of high heat and flame resistance is desirable.

What I claim as new and desire to secure by Letters Patent of the United States is:

1. A composition of matter comprising the product of reaction of a mixture comprising (1) an aldehyde and (2) a condensation product of (a) an alkaryl ester selected from the class consisting of alkaryl phosphates and carbonates containing reactive halogen in the alkyl radical thereof and (b) a phenol selected from the class consisting of phenol and monosubstituted phenols.

2. A composition as in claim 1 wherein the aldehyde is formaldehyde.

3. A composition as in claim 1 wherein the alkaryl ester is an alkaryl phosphate.

4. A composition of matter comprising the product of reaction of a mixture comprising (1) formaldehyde and (2) a condensation product of tricresyl phosphate containing reactive halogen in a methyl radical thereof and a phenol selected from the class consisting of phenol and monosubstituted phenols.

5. A heat-curable resinous composition comprising the product of reaction of a mixture comprising (1) paraformaldehyde and (2) a condensation product of tricresyl phosphate containing reactive chlorine in a methyl radical thereof and a phenol selected from the class consisting of phenol and mono-substituted phenols.

6. A product comprising the cured resinous composition of claim 5.

7. The method of producing a resinous composition which comprises effecting reaction under heat between the components of a mixture comprising essentially (1) an aldehyde and (2) a condensation product of (a) an alkaryl ester selected from the class consisting of alkaryl phosphates and carbonates containing reactive halogen in the alkyl radical thereof and (b) a phenol selected from the class consisting of phenol and mono-substituted phenols.

8. The method of producing a resinous composition which comprises effecting reaction at an elevated temperature between ingredients comprising (1) an aldehyde and (2) a condensation product of an alkaryl phosphate containing reactive halogen in the alkyl radical thereof and a phenol selected from the class consisting of phenol and mono-substituted phenols.

9. The method of producing a flame-resisting resinous composition which comprises effecting reaction under heat between ingredients comprising (1) formaldehyde and (2) a condensation product of phenol and tricresyl phosphate containing chlorine in both the phenyl and methyl groupings thereof.

10. A flame-resisting composition comprising the resinous reaction product of ingredients comprising (1) paraformaldehyde and (2) a condensation product of cresol and tricresyl phosphate containing chlorine in both the phenyl and methyl groupings thereof.

ROBERT E. BURNETT.